Patented June 8, 1926.

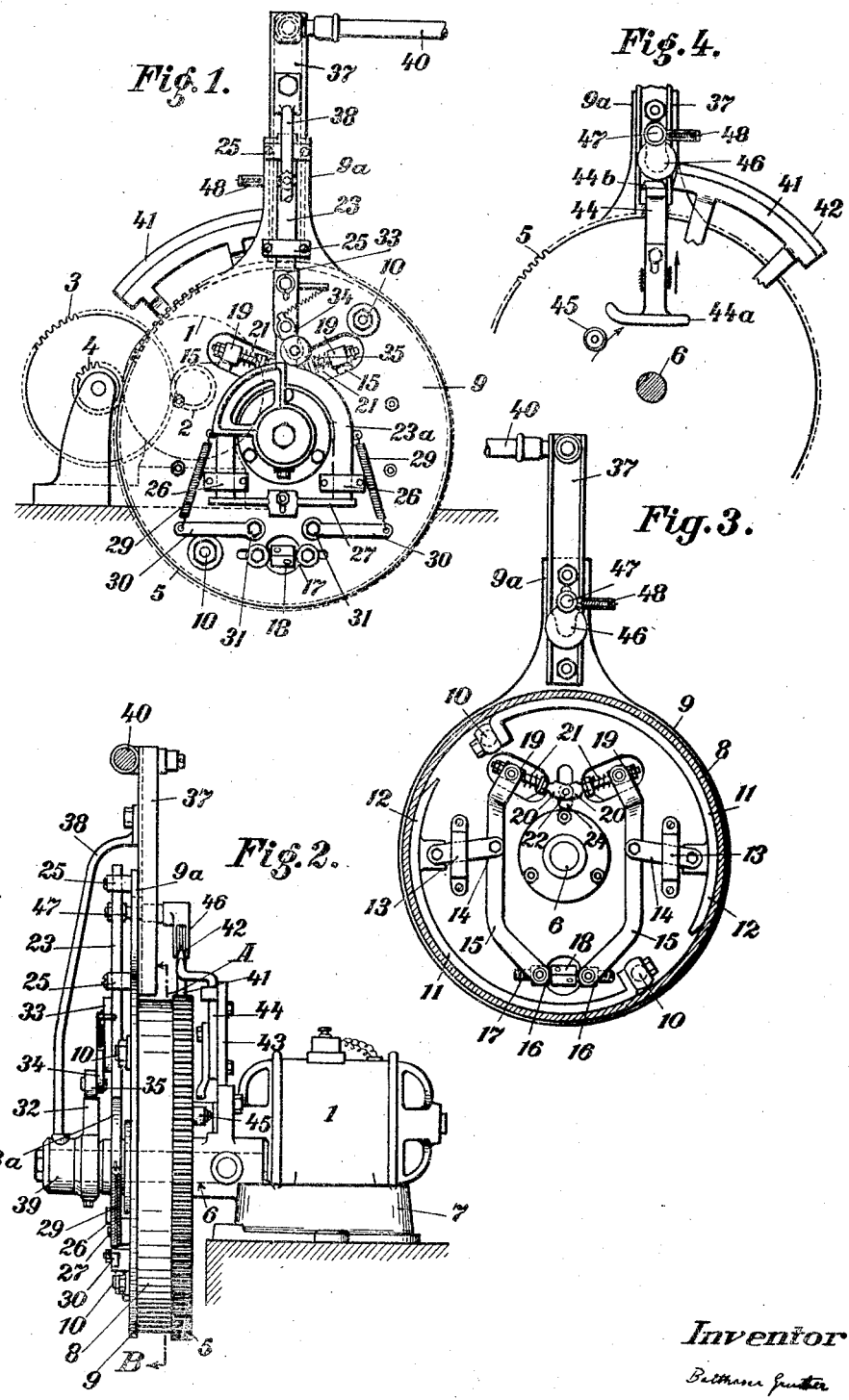

1,587,829

UNITED STATES PATENT OFFICE.

BALTHASAR GRÜTER, OF RUSWIL, SWITZERLAND.

MECHANISM FOR TEMPORARILY CONNECTING A MOTOR WITH THE RINGING MECHANISM OF A BELL.

Application filed July 31, 1924, Serial No. 729,419, and in Switzerland October 5, 1923.

Bell ring mechanisms have become known in which the motor-power transmission on the bell is effected by the actions of a band brake.

According to the invention the impulse is transmitted to the bell by the coupling of an inner blocking braking device. With this object in view a toothed wheel driven from the motor has a lateral brake tire driven from the engine and at the side of the toothed wheel, on the same axle, a driving ram is mounted, so that it can freely revolve, said ram terminating at the lower end in a disk on the rear side of which, facing the toothed wheel, two brake jaws are arranged, which are connected with one another by a lever system, and which are positively connected in outward direction towards the brake tire of the toothed wheel by the operations of a mechanical steering mechanism.

An embodiment of the invention is shown by way of example on the accompanying drawings, in which Fig. 1 is a front elevation.

Fig. 2 a side elevation.

Fig. 3 a section on line 3—3 of Fig. 2, and

Fig. 4 a rear elevation.

On the shaft of the motor 1 a pinion 2 is keyed which meshes with a spur wheel 3. A pinion 4 mounted on the same shaft as spur wheel 3 is in gear with a spur wheel 5 loosely mounted on a shaft 6. This shaft 6 is mounted in an engine block 7 so that it cannot rotate. The spur wheel 5 has a lateral crown 8 which acts as brake crown, as will be hereinafter described. At the side of the brake crown 8 a disk 9 is loosely mounted on shaft 6 so that it is adapted to be angularly displaced with regard to the brake crown 8, this disk forming a capsule together with the brake crown and the spur wheel 5. On the side of this disk 9 turned towards the spur wheel 5 two brake jaws 11 are pivotally mounted on pivot pins 10 in the capsule which form a clutch brake together with the crown 8. On the ends 12 of these brake jaws 11 links 14 guided in guide pieces 13 are hingedly fixed, the other ends of said links being hingedly connected with levers 15. These levers 15 are at the one end pivotally mounted on nuts 16 keyed on the two parts of a bolt 17 having opposite threads so that, when said bolt is being rotated in a central square piece 18, the distance between the nuts 16 and consequently the pivot points of the corresponding ends of the levers can be varied. The other ends of levers 15 are hingedly connected with plates 19 mounted on bolt 20 and kept away from one another by the action of springs 21. The bolts 20 are pivotally connected by a stud 22 with a rod 23 arranged on the other side of disk 9, said bolt traversing a longitudinal slot 24 of disk 9.

The rod 23 is guided on guide pieces 25 so that it can be moved in vertical directions, said guide pieces 25 being arranged on the disk 9 and on an upper extension 9ª of the same. The rod 23 has at its lower end a horse-shoe-shaped part 23ª the two arms of which are vertically guided in guide brackets 26 of disk 9. The horse-shoe-shaped part 23ª rests upon a cross piece 27 which forms an abutment and is adjustable in vertical direction by means of a slit and nut. Two springs 29 attached at the one end to the horse-shoe shaped piece 23ª have the tendency to pull this piece 23ª towards the abutment 27. The other ends of the springs 29 are attached to levers 30 the angular position to the horizontal plane of said levers being adjusted by means of bolts 31 whereby the tension of the springs 29 is varied.

On the shaft 6 a sector 32 is adjustably mounted. On rod 23 a bracket 33 is mounted so that it can be adjusted in vertical direction and on this bracket an oscillable arm 34 is suspended which carries on its end a roller 35. A spring 36 has the tendency to pull said arm into the vertical position.

On the extension 9ª of disk 9 a reinforcing bar 37 is fixed which by means of a stay 38 is connected with a ring 39 loosely mounted on shaft 6. The connecting rod 40 is hingedly connected with the upper end of the reinforcing bar 37 and positively connected with the beam carrying the bell, said beam being not shown on the drawing.

An upper segment 41 is arranged concentrically to shaft 6 so that it is stationary but adjustable as regards the distance from said shaft 6.

This segment 41 which at the upper end is wedge-shaped is fixed by screws on the supporting plate 43 at a distance from the axle 6, which distance is adjustable by means of screws in incisions of said plate 43 which is fixed behind the large toothed wheel 5 in a bracket 42 of the machine frame. On this supporting plate 43 a bar 44 is arranged in front of or at the side of the segment 41 so that said bar is slidable in guides 43ᵃ, said bar having at its lower end a shoe 44ᵃ and carrying at the upper end a segment 44ᵇ which is also wedge-shaped and forms a short extension of the segment 41. By an abutment roller 45, fixed on the toothed wheel 5, the bar 44 can be raised in vertical direction. Directly above the segment 44ᵇ a pawl 46 is arranged which is mounted on a bolt 47 traversing a longitudinal slot of the extension 9ᵉ of the disk and of the reinforcing bar 37, said bolt being fixed by screws on the steering rod 23 in a similar manner as the bolt 22. A spring 48 securely holds the pawl 46 in the vertical position in order to prevent undesirable oscillation at the working.

When the bell is at rest the roller 45 fixed to one of the spokes of the toothed wheel 5 does generally not stand directly underneath the shoe 44ᵃ so that, when the mechanism is operated, the motor can start without being loaded. If now the motor and with the same the gear wheels are started by the switching in of the electric current the roller 45 is brought by the rotation of the toothed wheel 5 under the shoe 44ᵃ of bar 44 so that this bar is lifted and its top end, consisting of the segment 44ᵇ, moves the pawl 46 and consequently also the rod 23 in upward direction. The lever system for the brake, having an inner jaw, said lever system being connected with the rod 23 by the bolt 22 and being arranged upon the inner surface of disk 9 as shown in Fig. 3, is operated, the brake jaws 11 moving away the one from the other and being pressed against the inner surface of the brake band 8 whereby the disk 9 is coupled with the toothed wheel 5.

Owing to this coupling the driving arm on the disk 9, which has been called "reinforcing bar 37", is swung to the right when the gear wheel 5 rotates in right hand direction and this so long as coupling exists. Owing to the positive connection of the arm 37, by a connecting rod 40, with the bell yoke an impulse is exerted upon the bell whereby the same is brought out of the position of rest. The impulse required for the upward swing of the bell is at first very short as at the rotation of disk 9 with arm 37 the pawl 46 rolls upon the segment 44ᵇ and later on upon the fixed segment 41, and the roller 35 jumps off the segment 32. The rod 23 is thus always returned into its original position, whereby the coupling of disk 9 and gear wheel 5, due to the closing of the brake, is suppressed so that the bell, when the driving arm 37 swings to the left, can freely swing back beyond its position of rest, while the gear wheel 5 executes the second half-rotation. Owing to the synchronism of the transmission ratio of the machine and the swinging amplitude of the bell the roller 45 gets, when the forward movement begins again, always under the shoe 44ᵃ and produces, in the above described manner, a new impulse. At increasing swinging amplitude of the bell the segment under the shoe 44ᵃ which is designed merely for the first starting-swinging movement loses its effectiveness as, when the bell swings back at the movement of the driving arm 37 to the left, the pawl 46 slides over the segment 44ᵇ upon the fixed segment 41 in the swung out position in consequence of the higher position of the segment 41 with regard to the segment 44ᵇ. The pawl 46 rolls, with clamping engagement, upon the other side always at the oscillation of the driving arm 37 in right hand side direction simultaneously with the forward swinging of the bell, and effects always the shifting of rod 23 in upward direction which is necessary for the swinging of the bell.

In order to lengthen the time of coupling in accordance with the upward swing of the bell, the roller 35, which is suspended on the rod 23 by means of a lever 34 so that it can swing only in right hand direction, bears at the upward movement of rod 23 upon the segment 32 and rolls over the same to jump off always from the end of said segment e. g. at the middle of the oscillating movement of the driving arm 37 and at the middle of the corresponding swinging movement of the bell, to disengage the coupling. The greater the oscillations of the driving arm 37 with disk 9 become, the farther back the shifting in upward direction of rod 23 effected by the pawl 46 will take place and consequently the contact of roller 35 with segment 32, and the longer will become the travel of the roller 35 on the segment 32. The swinging height required for the correct ringing of the bell can be determined by the length of the peripherical arc of the segment 32 coacting with the pawl 46 as, as soon the pawl 46 moves, at the left side oscillation of the driving arm during the back swing of the bell, beyond the end of segment 41 and begins to drop off the segment 41 at the right hand oscillation, it can evidently at the forward swing of the bell and the oscillation of arm 37 to the right connected therewith, no longer roll on the segment 41 with clamping engagement and consequently not effect any more the shifting of rod 23 and the coupling for the transmission of the impulse. The pawl 46 slides consequently upon and over the segment 41 when it is in the rearwardly swung out position. When the rod 23 is not shifted in outward direction the roller 37 can no longer bear upon the lower segment 32 and consequently rolls again in the same position oscillated to the right as at the return movement over the segment 32. The impulses which have to be transferred for maintaining the swinging amplitude required for a correct ringing of the bell begin only when the swinging movements of the bell begin to decrease, so that at each oscillation of arm 37 to the left, the pawl 46 can work again at the rearmost point on the segment 41 and thus produce a new impulse. The bell is therefore not stopped or braked at a certain height of swinging but left free while the motor with the wheel gear of the machine runs idle.

I claim:

A coupling mechanism for bell ringing machines for the temporary transmission of the motoric force upon the bell, comprising in combination with the driving motor, a gear wheel driven from said motor, a brake crown on said gear wheel, a disk arranged at the side of said gear wheel so that it can freely rotate, brake jaws on said disk, a lever system connected with said brake jaws, and a connecting rod shiftable in longitudinal direction for operating said lever system with said brake jaws for pressing the same against said brake crown to produce the coupling.

In testimony whereof I affix my signature.

BALTHASAR GRÜTER.